(12) United States Patent
Nelson et al.

(10) Patent No.: US 9,215,272 B2
(45) Date of Patent: *Dec. 15, 2015

(54) METHOD FOR SECURELY DISTRIBUTING MEETING DATA FROM INTERACTIVE WHITEBOARD PROJECTOR

(71) Applicant: Seiko Epson Corporation, Tokyo (JP)

(72) Inventors: Steve Nelson, San Jose, CA (US); Victor Ivashin, Danville, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/497,359

(22) Filed: Sep. 26, 2014

(65) Prior Publication Data

US 2015/0012836 A1  Jan. 8, 2015

Related U.S. Application Data

(63) Continuation of application No. 13/457,656, filed on Apr. 27, 2012, now Pat. No. 8,874,657.

(51) Int. Cl.
| | | |
|---|---|---|
| *G06F 15/16* | (2006.01) | |
| *H04L 29/08* | (2006.01) | |
| *G06Q 10/10* | (2012.01) | |
| *G06F 17/30* | (2006.01) | |
| *H04L 29/06* | (2006.01) | |

(52) U.S. Cl.
CPC .......... *H04L 67/10* (2013.01); *G06F 17/30117* (2013.01); *G06F 17/30887* (2013.01); *G06Q 10/10* (2013.01); *H04L 29/06972* (2013.01); *H04L 65/4015* (2013.01)

(58) Field of Classification Search
CPC ......... H04L 67/02; H04L 67/06; H04L 67/10; G06F 17/30861; G06F 17/30117; G06F 17/30887; G06Q 10/10
USPC .................. 709/203–204; 715/738; 358/1.15
See application file for complete search history.

(56) References Cited

U.S. PATENT DOCUMENTS

| | | |
|---|---|---|
| 5,717,879 A | 2/1998 | Moran et al. |
| 5,854,893 A | 12/1998 | Ludwig et al. |
| 6,347,333 B2 | 2/2002 | Eisendrath et al. |
| 6,351,777 B1 | 2/2002 | Simonoff |
| 6,378,001 B1 | 4/2002 | Aditham et al. |
| 6,408,336 B1 | 6/2002 | Schneider et al. |
| 6,437,786 B1 * | 8/2002 | Yasukawa ...................... 345/474 |
| 6,463,460 B1 | 10/2002 | Simonoff |
| 6,501,463 B1 | 12/2002 | Dahley et al. |
| 6,793,352 B2 | 9/2004 | Karasawa et al. |
| 6,874,892 B1 * | 4/2005 | McDaniel ........................ 353/84 |
| 6,954,894 B1 | 10/2005 | Balnaves et al. |
| 7,043,529 B1 | 5/2006 | Simonoff |
| 7,213,051 B2 * | 5/2007 | Zhu et al. ...................... 709/205 |
| 7,287,053 B2 | 10/2007 | Bodin |
| 7,313,589 B2 * | 12/2007 | Tran et al. ..................... 709/203 |
| 7,428,000 B2 | 9/2008 | Cutler et al. |
| 7,433,915 B2 * | 10/2008 | Edwards et al. .............. 709/203 |
| 7,574,725 B2 | 8/2009 | Stiliadis |

(Continued)

*Primary Examiner* — Viet Vu
*Assistant Examiner* — Michael A Chambers (57) ABSTRACT

Distributing meeting data from an interactive whiteboard projector to at least one computer of a meeting member, comprises: in the interactive whiteboard projector, using a processor to save meeting data, generate a password, display a screen with a URL of the projector and the password and use a web server to transfer the meeting data from the interactive whiteboard projector to the at least one computer.

13 Claims, 5 Drawing Sheets

(56) References Cited

U.S. PATENT DOCUMENTS

| | | | |
|---|---|---|---|
| 8,028,020 B2* | 9/2011 | Huck et al. | 709/204 |
| 8,085,417 B2* | 12/2011 | Funamizu | 358/1.15 |
| 8,130,408 B2* | 3/2012 | Okazawa | 358/1.18 |
| 8,155,768 B2* | 4/2012 | Akaiwa et al. | 700/83 |
| 8,194,118 B2 | 6/2012 | Solomon | |
| 8,271,887 B2 | 9/2012 | Offer et al. | |
| 8,355,892 B2 | 1/2013 | Kvavle et al. | |
| 8,364,129 B1 | 1/2013 | Beyer, Jr. | |
| 8,682,241 B2* | 3/2014 | Huerta | 434/362 |
| 8,749,487 B2* | 6/2014 | Mishima et al. | 345/158 |
| 8,818,027 B2* | 8/2014 | Forutanpour et al. | 382/103 |
| 2001/0044833 A1 | 11/2001 | Eisendrath et al. | |
| 2002/0059611 A1 | 5/2002 | Stiliadis | |
| 2002/0113773 A1 | 8/2002 | McDonnell et al. | |
| 2003/0115263 A1* | 6/2003 | Tran et al. | 709/203 |
| 2003/0117532 A1 | 6/2003 | Karasawa et al. | |
| 2005/0033805 A1* | 2/2005 | Fujiyama et al. | 709/204 |
| 2005/0044167 A1* | 2/2005 | Kobayashi et al. | 709/217 |
| 2005/0044384 A1 | 2/2005 | Kimura | |
| 2007/0099163 A1 | 5/2007 | Tseng | |
| 2007/0112926 A1 | 5/2007 | Brett et al. | |
| 2007/0216943 A1* | 9/2007 | Funamizu | 358/1.15 |
| 2007/0299982 A1* | 12/2007 | Armstrong et al. | 709/231 |
| 2008/0030797 A1 | 2/2008 | Circlaeys et al. | |
| 2008/0234843 A1* | 9/2008 | Akaiwa et al. | 700/83 |
| 2009/0041524 A1* | 2/2009 | Okazawa | 400/76 |
| 2009/0207321 A1 | 8/2009 | Karasawa | |
| 2009/0213070 A1 | 8/2009 | Kalaldeh et al. | |
| 2009/0216837 A1 | 8/2009 | Rao et al. | |
| 2010/0005150 A1* | 1/2010 | Kubota et al. | 709/212 |
| 2010/0030578 A1 | 2/2010 | Siddique et al. | |
| 2010/0106844 A1 | 4/2010 | Ota | |
| 2010/0291528 A1* | 11/2010 | Huerta | 434/362 |
| 2011/0013147 A1 | 1/2011 | LaDuke | |
| 2011/0025650 A1 | 2/2011 | Joscelyne | |
| 2011/0063215 A1* | 3/2011 | Mishima et al. | 345/158 |
| 2011/0238808 A1 | 9/2011 | Natori et al. | |
| 2011/0243380 A1* | 10/2011 | Forutanpour et al. | 382/103 |
| 2011/0321111 A1 | 12/2011 | Chae et al. | |

* cited by examiner

# METHOD FOR SECURELY DISTRIBUTING MEETING DATA FROM INTERACTIVE WHITEBOARD PROJECTOR

CROSS-REFERENCE TO RELATED APPLICATION(S)

This application is a continuation of Ser. No. 13/457,656, filed Apr. 27, 2012, which is related to commonly owned U.S. patent application Ser. No. 13/332,751, filed Dec. 21, 2011, which is hereby incorporated by reference in its entirety.

FIELD OF INVENTION

The present invention relates generally to interactive whiteboard projectors (IWPs) and pertains to sharing meeting content that has been stored on the IWP. More specifically, the present invention relates to distributing the IWP stored content to meeting participants in a secure manner.

BACKGROUND

In the past, a projector and an interactive whiteboard were used to create an interactive and collaborative meeting environment. Now, a single product, known as an interactive whiteboard projector (IWP) can make almost any wall, or even a tabletop, interactive. One such commercial product is the Epson BrightLink 455Wi interactive whiteboard projector.

Interactive whiteboard projectors can turn any surface into a collaborative interactive workspace. They function like an interactive whiteboard without a dedicated board—almost any surface can be utilized. An electronic whiteboard pen can be used as a mouse to draw, write and click. It can be used to draw and annotate on the visuals being presented.

The Epson BrightLink 455Wi projector plus pen combination integrates interactive functionality in one machine without the constraints or expense of a conventional interactive whiteboard and is compatible with Windows® Ink Tools to easily add annotations and more. Because it is an ultra-short throw distance projector, it can be mounted on any wall or ceiling to project a whiteboard surface image from a very short distance, thus eliminating or reducing shadowing of the person interacting with the whiteboard surface. Individuals interact with the whiteboard surface using an infrared pen, and the system software is platform independent so that the user can work with virtually any Web 2.0 application, digital media file, or eTextbook. The interactive software allows the user to draw on the screen, highlight areas, save annotations, and toggle between pen and mouse modes.

In reference to the present invention, the term "meeting" will be used in a general sense. A meeting could be, for example, in a corporate setting with various presenters showing Powerpoint slides, PDF files, Word documents, etc., or a classroom setting with a teacher presenting a lesson and the students interacting with the whiteboard screen to offer solutions to problems, or any other various presentation setting where videos, photos, or slides are shown.

In a typical corporate meeting, for example, users may generate many pages of drawing data that are cached on the interactive whiteboard projector (IWP). Additional data such as images, Powerpoint slides, PDF files, videos, Word documents, etc. may be uploaded by users to the IWP to be displayed or annotated. Once the meeting concludes, meeting participants need an easy, secure method for accessing data stored on IWP.

Various methods have been proposed for delivering meeting information to participants. Email is one example. The IWP can be configured over a network to have access to an enterprise email server. In this example, meeting participants email addresses are entered into the IWP and the IWP is programmed to send all meeting content to the list of email addresses through the enterprise email server. However, this mode of delivery has certain limitations. It requires IT staff to configure the projector and email server to allow access. The IWP must have access to a global email address list and each meeting participant's email address must be added to the meeting. For security, email contents must be encrypted and passwords provide through another channel such as a phone message. Users cannot interactively select specific content and ignore others, and the limited capacity of the typical email server may cause large attachments to be rejected.

Another possible method is the use of a USB key (a data storage device that includes flash memory with an integrated Universal Serial Bus (USB) interface). In this instance, the meeting leader places a USB key in the IWP and saves the meeting content to the key. A USB key is then physically given to each meeting participant to copy to their personal computers. However, this is a slow and cumbersome process, and some meeting participants may not have a laptop in the conference room, or their device, e.g. iPad® or smart phone, may not have a USB port. Many companies do not allow USB keys to be used within the corporation because of security concerns. Also, since the meeting content is just a list of files, users may have difficulty finding the specific items that they are most interested in saving.

Another solution for distributing the meeting content is to save it to a local file server. If the IWP has access to an enterprise file server, once the meeting is over, the meeting contents are saved to a directory on the file server. However, this requires the IT staff to configure the IWP and file server to allow access. For highest security, meeting content must be encrypted. This requires a password to be distributed. Many meetings involve members that are not in a predefined enterprise security group. This requires meeting files on an enterprise file server to be accessible to all, which is unacceptable if confidential items are discussed in the meeting. Further, the IWP firmware must have the capability of writing and reading data across a network using network disk protocols including a security model.

Lastly, a possible solution is to save to the meeting contents to the cloud (a web-based service). If the IWP has access to a service on the cloud such as Google Docs, once the meeting is over, the meeting contents are converted and uploaded to the cloud service. This solution also has many limitations. It requires the IT staff to configure the IWP and cloud service to allow access. The IWP would have to be programmed to understand network protocols and document formats supported by many different service providers. Many IT departments prohibit the use of such services due to security and internal document policies. Also, many services do not have the concept of groups so all meeting participants would need to have an account at the service provider, such as Google, in addition to their corporate email account.

Therefore, it would be desirable to have a way of distributing meeting content from the interactive whiteboard projector to meeting participants that would be secure but without the disadvantages of other solutions proposed above.

SUMMARY OF INVENTION

The present invention provides an interactive whiteboard projector, a method, and computer-readable media for distributing meeting data from an interactive whiteboard projector to at least one computer of a meeting member. More specifically, a processor in the interactive whiteboard projector saves meeting data, generates a password, causes display of a screen with a URL of the projector and the password, and uses a web server to transfer the meeting data from the interactive whiteboard projector to the at least one computer.

In a preferred embodiment, a processor in the at least one computer access the URL of the projector using a web browser and the password, and downloads the meeting data from the interactive whiteboard projector.

In a further embodiment, the processor in the at least one computer selects individual whiteboard files of meeting data for downloading from the interactive whiteboard projector.

In another embodiment, the meeting data saved on the interactive whiteboard projector is deleted once all meeting data has been downloaded.

In an embodiment, encrypted meeting data is transferred from the interactive whiteboard projector to the at least one computer across a network using an https protocol.

In yet another embodiment, the password is a time-expiration password, and preferably, the meeting data saved on the interactive whiteboard projector is deleted once the time-expiration password has expired.

In a further embodiment, a QR Code (Quick Response Code) is displayed on the screen with the URL embedded.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
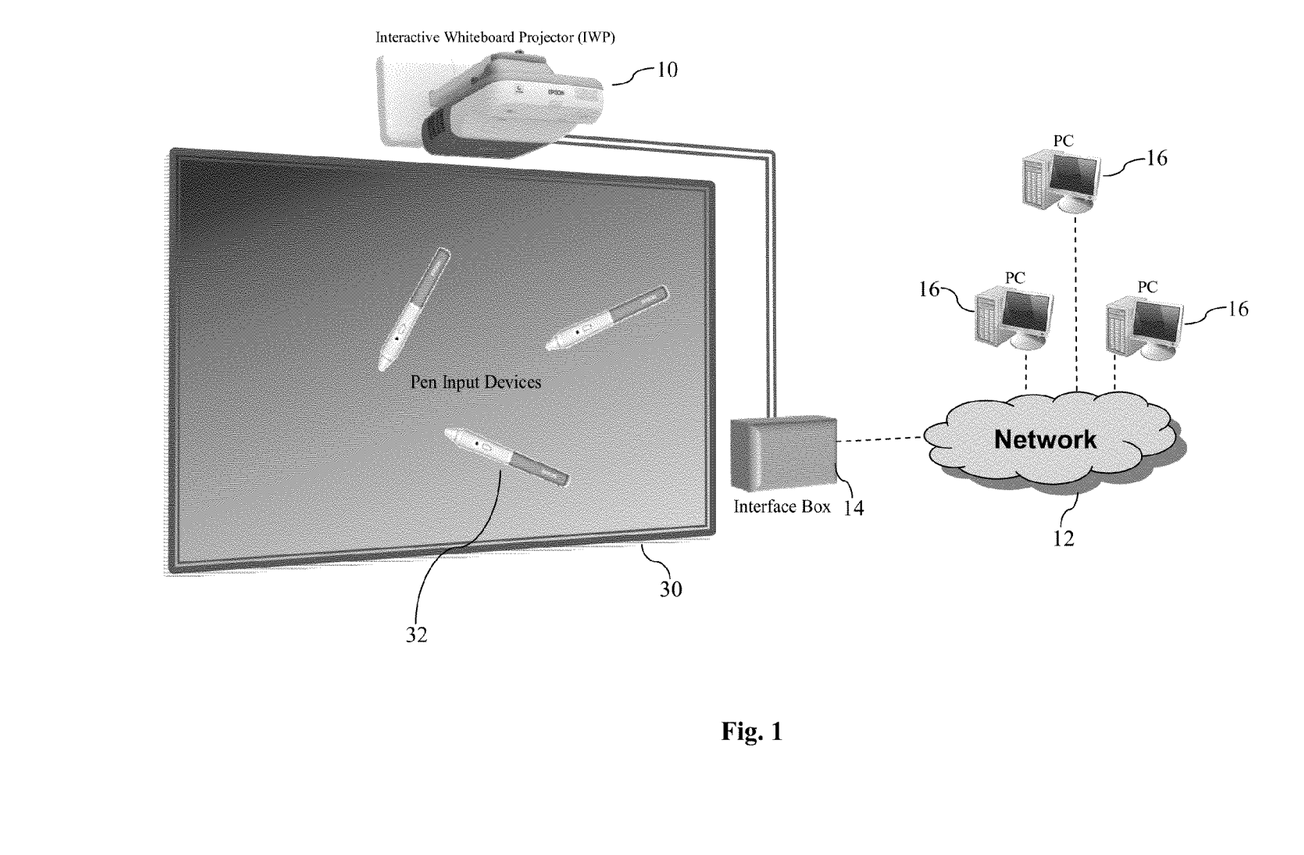
FIG. 1 shows a general view of an interactive whiteboard projector (IWP) connected to one or more computers through a network.

FIG. 1 shows a general view of an interactive whiteboard projector (IWP) 10 connected to a network 12 through an interface box 14. The IWP 10 projects an image onto a surface 30. This surface can be a wall, a conventional non-electronic whiteboard, or even a table top. The Epson BrightLink 455Wi interactive whiteboard projector, for example, includes a driver for interactive pens 32, which can be used to draw on the surface 30, highlight areas of the projected image, save annotations to the projected image, and toggle between a pen mode and a mouse mode. One or more computers 16 can connect to the IWP 10 through network 12, or directly through a USB port on the projector 10 or interface box 14. In FIG. 1, computers 16 are illustrated as PCs, but in a corporate meeting setting, for example, some or all of the computers 16 would be laptops, tablets such as iPad®, or hand-held devices.

Figure 2:
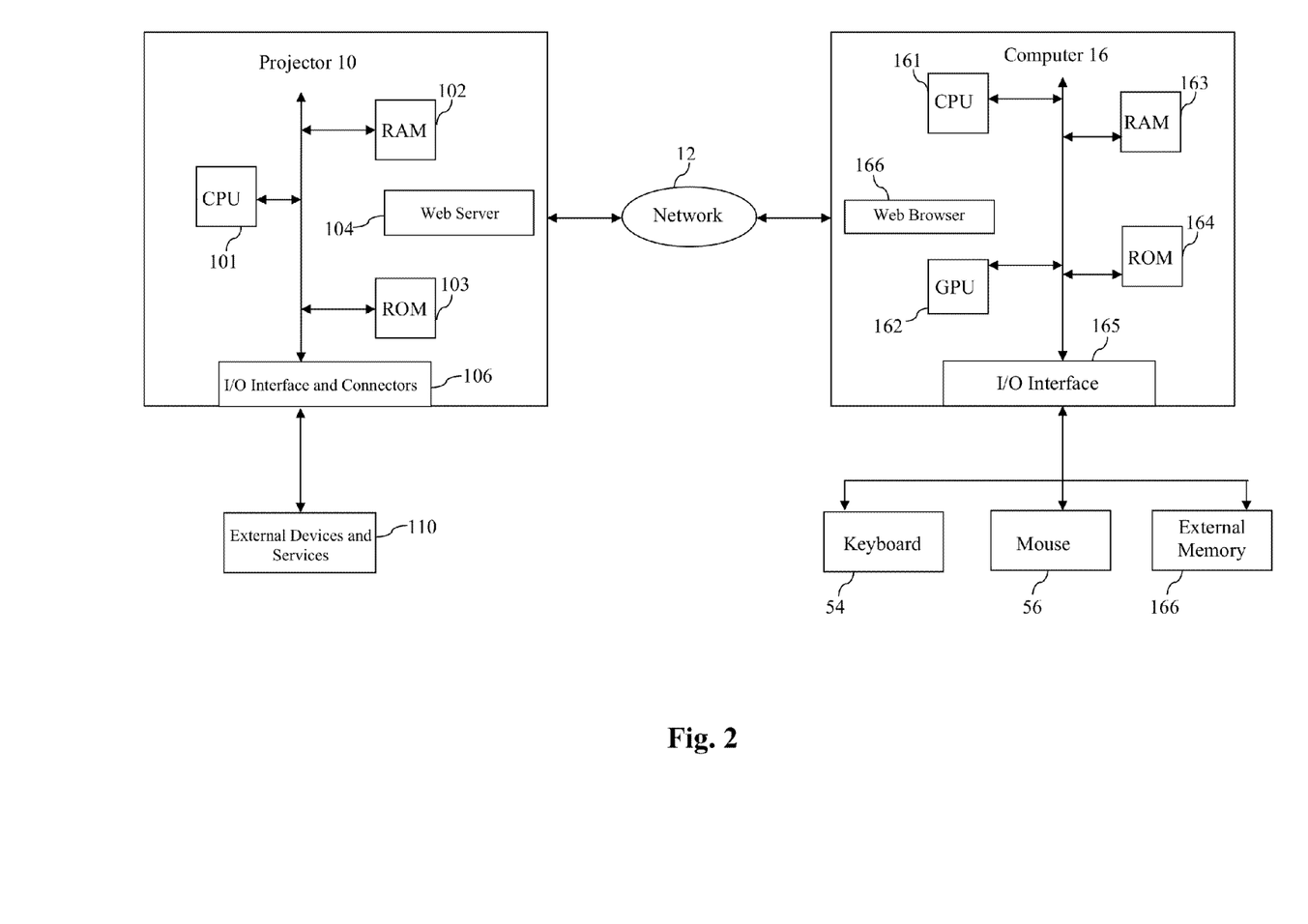
FIG. 2 is a simplified block diagram view with more detail of a projector and computer.

FIG. 2 shows a simplified block diagram view with more detail of projector 10 and computer 16. The method steps of the present invention described hereinafter are preferably performed by one or more processors in the projector 10 and/or computer 16 executing computer-executable instructions, programs, software, firmware, that are stored or loadable in memory in projector 10 and/or computer 16 and/or in accessible external memory. Computer 16 processors may include, for example, a central processing unit (CPU) 161 and one or more graphical processing units (GPU) 162. The internal memory may include, for example, RAM 163 and ROM 164. I/O interface 165 enables communication with keyboard 54, mouse 56, external memory 166, and/or a touch screen device (not shown) for example. Client projector 10 may similarly include a CPU 101, RAM 102, and ROM 103. I/O Interface and Connectors 106, which may be integrated in projector 10 and/or interface box 14 (FIG. 1), allow connection to and/or communication with external devices and services 110. These may include, for example, connectors and interfaces for an educational or business environment.

For example, in the Epson BrightLink 455Wi IWP there are two VGA ports that can each connect to either a computer 16 or a component video source. Also included are an S-Video port and a composite video jack. Each of these is paired with its own stereo audio input, with a miniplug input for each VGA port and one set of two RCA phono plugs shared by the S-Video and composite video ports. The connection panel also offers a pass-through monitor connector, a microphone input, a miniplug stereo audio output, two USB ports, an RS-232 port, and a LAN connection. One USB port is meant primarily for a document camera. The other is for connection to a computer 16 that allows use of the interactive feature of projector 10. In addition, an Ethernet port allows projector 10 to be managed from a computer 16 over network 12. A wireless 802.11 port may also be provided for connection to a wireless network. The RS-232 port can be used to run diagnostics as well as turn the projector on or off though a third party controller. Data can also be sent to projector 10 over a LAN or over the USB port.

In a preferred environment, projector 10 includes a Web Server 104, which may be any one of the many commercially available proprietary web server software packages (e.g. Microsoft IIS, Oracle HTTP Server, etc.) or an open-source web server (e.g. Apache, Nginx, Lighttpd, etc). The computer 16 preferably has a conventional Web Browser 166 such as Internet Explorer, Firefox, Google Chrome, Safari, etc.

Figure 3:
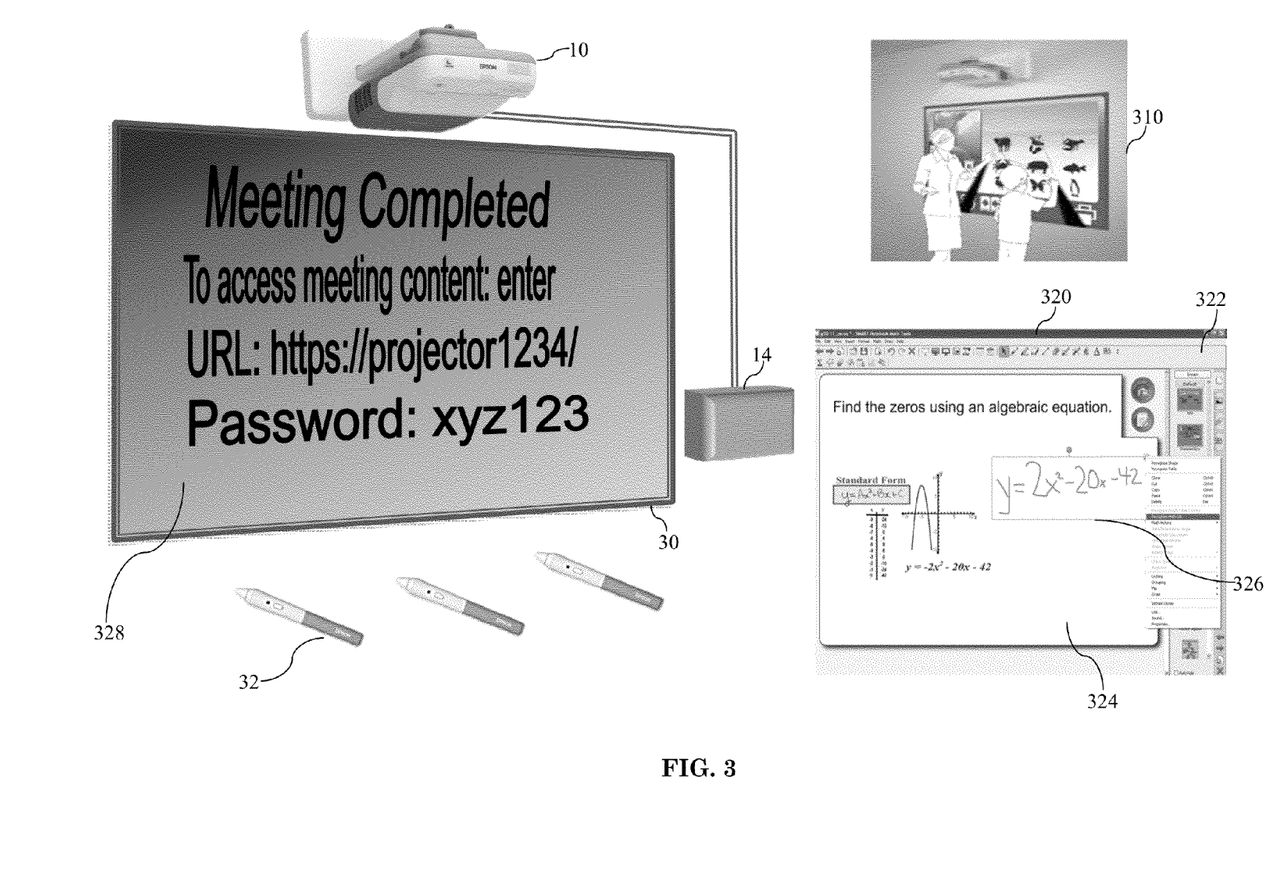
FIG. 3 illustrates an example of an interactive whiteboard meeting.

FIG. 3 illustrates an example of an interactive whiteboard meeting. A projected screen 328 with instructions on how to download the meeting data from IWP 10 will be discussed in detail later (with reference to FIG. 4). A classroom setting is shown in block 310. The short-throw projection IWP 10 is mounted on a wall above a projection surface 30 so that shadows cast by the teacher and student are minimized. A teacher and student can both interact with IWP 10 using pen(s) 32. Block 320 shows a projection of a computer 16 desktop 322 with screen 324 from an application program such as Powerpoint, Word, Excel, etc. that might be used in a corporate meeting. Using a pen 32, the screen 324 can be annotated, for example, by adding formula 326 that can be saved to the IWP 10. All meeting data including projections of original pages, screen drawings, annotations, etc. are saved as whiteboard files in memory, e.g. RAM 102, of IWP 10 using, for example, SVG (Scalable Vector Graphics) or a portable network graphic (png) extension.

Figure 4:
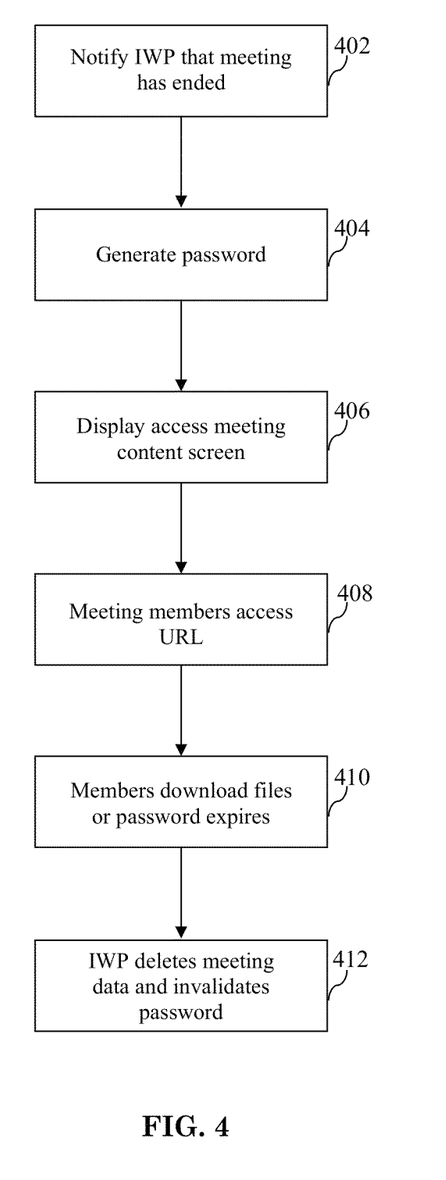
FIG. 4 is a flowchart illustrating the general steps of the present invention.

FIG. 4 illustrates the general steps of the present invention for securely distributing the meeting data, i.e. whiteboard files, to meeting attendees. At the end of the meeting, the meeting administrator (i.e. meeting organizer, teacher, IT personnel, etc.) notifies the IWP 10 that the meeting has concluded (step 402). This notification can be performed by pressing a button on a control panel located on the IWP 10 or interface box 14, through remote control, a web based control panel, command from a connected computer 16, or any suitable control command method.

A processor, e.g. CPU 101, on IWP 10 generates a permanent or timed-expiration password for the meeting data (step 404). Settings in the IWP control what type of password (e.g. number of characters, alpha-numeric, caps, lower-case, etc.) is generated and how long is it valid if it is a timed-expiration password. The settings, which can be stored in ROM 103 or RAM 102, for example, can be overridden on a meeting by meeting basis.

Next IWP 10 displays a projected screen 328 (FIG. 3) with instructions on how to download the meeting data from IWP 10 (step 406). The screen has content with the following information, for example: "To access and save the meeting content for this meeting, access the address https://xxxxxx/ with your web browser. In the password box, enter the password yyyyyy;" where xxxxxx is the network address plus path of IWP 10 and yyyyyy is the password generated for the meeting by the IWP 10. Alternately or additionally, projected screen 328 can include a QR Code (Quick Response Code) with the URL embedded. The QR code can be read by a smart phone, for example.

If the conference room has windows and the projection surface 30 is visible to people outside the meeting, the meeting administrator can command the IWP 10 to play the password through a connected speaker instead of displaying the password on the screen 328.

Figure 5:
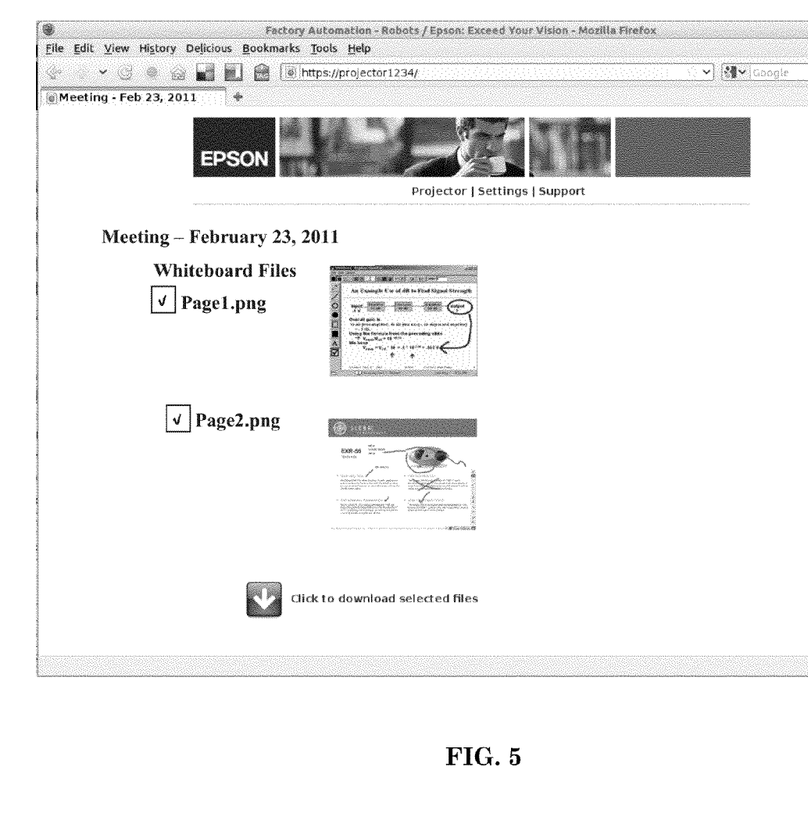
FIG. 5 shows an example of a projector web page that is accessed by meeting members to download meeting data.

When meeting members access the given URL (Uniform Resource Locator), step 408, using their web browser 166, a meeting information page is displayed with information about the meeting, a list of the meeting data generated or uploaded during the meeting, controls to select all or individual meeting data items, and controls to download the meeting data to the user's personal computer 16. An example of the meeting information page is shown in FIG. 5. The meeting members can then download all or selected whiteboard files (step 410). As shown in FIG. 5, individual whiteboard files, saved with a portable network graphic (png) extension, for example, can be selected or deselected for downloading to the meeting member's computer 16. The meeting data is encrypted when transferred across the network using the https protocol (Hypertext Transfer Protocol Secure) to the user's personal computer 16.

Once all meeting members have downloaded the meeting data (step 410), the meeting administrator can notify the IWP 10 through a button or other similar command that the meeting data can be destroyed. IWP 10 then deletes all meeting data stored internally and invalidates the meeting password (step 412). The meeting data can no longer be accessed by anyone.

In some circumstances, meeting members may not have time at the conclusion of the meeting to download the meeting data or may not have a laptop in the conference room. In this instance, a time-expiration password is beneficial. If the password is a time-expiration password, the meeting data will be deleted after the specified time period has passed after the end of the meeting.

The present invention offers several advantages over alternative methods. In the present invention, the IWP 10 configuration requires only an IP address. If the enterprise (school/company) uses DHCP (Dynamic Host Configuration Protocol), IWP 10 will acquire and configure the IP address automatically. IWP 10 does not require any additional permission such as access to email servers, file servers, or cloud based services.

Meeting users accessing the meeting data can use a standard web browser. No additional software installation is required. Also, the meeting data is not stored permanently in the IWP, thus adding a layer of security and reducing the need for additional internal memory. Further, IWP development time is reduced since the present invention utilizes existing tools and protocols.

Various embodiments can be implemented in digital electronic circuitry, or in computer hardware, firmware, software, or in combinations of them. Apparatus can be implemented in a computer program product tangibly embodied in a non-transitory machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

While the invention has been described in conjunction with several specific embodiments, it is evident to those skilled in the art that many further alternatives, modifications and variations will be apparent in light of the foregoing description. For example, to avoid https certificate requirements in the projector's web server, a protocol such as RFC 2945 may be implemented instead. RFC 2945 describes the Secure Remote Password Authentication and Key Exchange System, which does not require certificates.

Also, since browsers may not support RFC 2945 directly, the password entry screen in the web page delivered by the web server on the projector may include a dynamic component such as ActiveX for Internet Explorer, a Java applet, a plugin, or other component to implement the client protocol for RFC 2945.

Thus, the invention described herein is intended to embrace all such alternatives, modifications, applications and variations as may fall within the spirit and scope of the appended claims.

What is claimed is:

1. A method for distributing meeting data from an interactive whiteboard projector to at least one computer of a meeting member, comprising:

providing said interactive whiteboard projector, said interactive whiteboard projector being an image projector configured to project on any projection surface area an interactive image responsive to physical interactions between a human user and the projection surface area to create a collaborative interactive workspace lacking any dedicated interactive whiteboard, said image projector having an internal processor, an internal memory and internal web server software package, said image projector further having an Universal Resource Locator (URL);

in the image projector, using said internal processor to:
save meeting data, including at least some of the interactive image's responses to user inputs, in said internal memory; and
use said internal web server software package to transfer the meeting data from the image projector's internal memory to the at least one computer, wherein said at least one computer is remote from said image projector and uses said URL to access said image projector through a network.

2. The method as in claim 1, further comprising:
in the at least one computer, using a processor to:
access the URL of the projector using a web browser; and
transfer the meeting data from the interactive whiteboard projector.

3. The method as in claim 2, further comprising:
in the at least one computer, using the processor to
select individual whiteboard files of meeting data for transferring from the interactive whiteboard projector.

4. The method as in claim 2, further comprising deleting the meeting data saved on the interactive whiteboard projector once all meeting data has been transferred.

5. The method as in claim 1, further comprising transferring encrypted meeting data from the interactive whiteboard projector to the at least one computer across the network using a Hypertext Transfer Protocol Secure (HTTPS) protocol.

6. An interactive whiteboard projector for distributing meeting data to at least one computer of a meeting member, comprising:
an image projector configured to project an interactive image responsive to user inputs and lacking a dedicated interactive whiteboard, said image projector having an internal processor, an internal memory and internal web server software package, said image projector further having an Universal Resource Locator (URL);
wherein said internal processor is configured to:
save meeting data, including at least some of the interactive image's responses to user inputs, in said internal memory; and
use said internal web server software package to transfer the meeting data from the image projector's internal memory to the at least one computer, wherein said at least one computer is remote from said image projector and uses said URL to access said image projector through a network.

7. The interactive whiteboard projector as in claim 6, wherein the processor deletes the meeting data saved on the interactive whiteboard projector once all meeting data has been transferred to the at least one computer.

8. The interactive whiteboard projector as in claim 6, wherein the processor transfers encrypted meeting data from the interactive whiteboard projector to the at least one computer across the network using a Hypertext Transfer Protocol Secure (HTTPS) protocol.

9. One or more tangible, non-transitory computer-readable media embodying instructions executable by a data processor to perform a method for distributing meeting data from an interactive whiteboard projector to at least one computer of a meeting member, the method comprising:
wherein said interactive whiteboard projector is an image projector configured to project an interactive image responsive to user inputs and lacking a dedicated interactive whiteboard, and wherein said image projector houses said data processor, an internal memory and internal web server software package, and said image projector has an Universal Resource Locator (URL);
in the interactive whiteboard projector, using said data processor to:
save meeting data, including at least some of the interactive image's responses to user inputs, in said internal memory; and
use said internal web server software package to transfer the meeting data from the image projector's internal memory to the at least one computer, wherein said at least one computer is remote from said image projector and uses said URL to access said image projector through a network.

10. The one or more tangible, non-transitory computer-readable media as in claim 9, further comprising:
in the at least one computer, using a processor of the computer to:
access the URL of the projector using a web browser; and
transfer the meeting data from the interactive whiteboard projector.

11. The one or more tangible, non-transitory computer-readable media as in claim 10, further comprising:
in the at least one computer, using the processor of the computer to
select individual whiteboard files of meeting data for transferring from the interactive whiteboard projector.

12. The one or more tangible, non-transitory computer-readable media as in claim 10, wherein the method further comprises deleting the meeting data saved on the interactive whiteboard projector once all meeting data has been transferred by the at least one computer.

13. The one or more tangible, non-transitory computer-readable media as in claim 9, wherein the method further comprises transferring encrypted meeting data from the interactive whiteboard projector to the at least one computer across the network using a Hypertext Transfer Protocol Secure (HTTPS) protocol.

* * * * *